United States Patent [19] [11] 3,746,254
Duncan et al. [45] July 17, 1973

[54] POWDER SPRAY SYSTEM
[75] Inventors: Lane S. Duncan, Elyria; Simon Z. Tamny, Lorain; Charles H. Riedy, Lakewood, all of Ohio
[73] Assignee: Nordson Corporation, Amherst, Ohio
[22] Filed: Nov. 2, 1971
[21] Appl. No.: 194,830

[52] U.S. Cl. .................................... 239/15, 302/52
[51] Int. Cl. ............................................. B05b 5/00
[58] Field of Search ....................... 239/15, 85, 142, 239/143, 144, 600; 302/52; 317/3, 262

[56] References Cited
UNITED STATES PATENTS
3,575,344  4/1971  Angelico .............................. 239/15
3,667,674  6/1972  Parsons et al. ....................... 239/15
3,408,985  11/1968 Sedlacsik, Jr. .................... 239/15 X
3,608,823  9/1971  Buschor ............................... 239/15

FOREIGN PATENTS OR APPLICATIONS
812,601  4/1959  England ................................. 239/85

Primary Examiner—M. Henson Wood, Jr.
Assistant Examiner—Michael Mar
Attorney—James S. Hight, John D. Poffenberger et al.

[57] ABSTRACT
An electrostatic spray system for applying a solid particulate powder material to the surface of an article or substrate. The system includes a pneumatic conveyer line including a vacuum region for withdrawing powder from a hopper and entraining it in an air stream, after which it is propelled to an electrostatic spray gun while entrained in the air stream. To facilitate quick color or powder changes, the system includes an improved hopper having a check valve in the bottom which automatically closes when the hopper is removed from a supporting base and which is automatically opened when the hopper is placed upon the base. The system also includes a quick change hose connection at the handle of the gun for clamping and unclamping new hoses which extend between the hopper support and the electrostatic gun. To meter and control the rate of flow of powder from the hopper, the system includes a pneumatic metering control in the form of a variable air curtain injected into a powder flow passage located between the bottom of the hopper and the pneumatic conveyer line. As the pressure in this curtain is increased the flow in the system is reduced. The system also includes a pneumatic vibrator which is connected to a source of air pressure through a regulator common with the pneumatic conveyer so that the rate of vibration is always directly proportional to air flow in the pneumatic conveyer and to the vacuum in the conveyer which controls powder flow from the hopper. The electrostatic gun of this system has an adjustment for varying the shape of the spray pattern emerging from the gun while separating the flow of powder from the flow of entrainment air. The adjustment is so constructed that the size and dimensions of the discharge orifice of the gun are maintained fixed throughout the range of adjustment.

41 Claims, 12 Drawing Figures

Patented July 17, 1973 3,746,254

Patented July 17, 1973

Patented July 17, 1973

INVENTORS
Lane S. Duncan
BY Simon L. Tamny
Charles H. Riedy
Wood, Herron and Evans
ATTORNEYS

POWDER SPRAY SYSTEM

This invention relates to electrostatic spray systems and particularly to an electrostatic spray system for spraying solid particulate powders onto an article or substrate.

The practice of electrostatic spraying of liquid materials is now well established and quite commonly practiced commercially. Recently, however, there has been a great deal of interest and some commercial activity in electrostatic spraying of solid particulate materials. Such systems enable solid paints or other coating materials to be applied to a substrate without a liquid carrier or solvent. They therefore have the advantage of eliminating the cost of the liquid carrier or solvent which has always heretofore been required. Such systems also have the advantage of ease of application and control; less expensive application equipment, a wide range of film thicknesses is obtainable, and the problem of controlling exhaust to atmosphere is minimized or eliminated.

Electrostatic powder spray systems operate on the principle of transporting a finely divided powder, generally on the order of 150 mesh to a spray gun or spray head while entrained in an air or gaseous stream. The power is subsequently transferred from the gun to the substrate by an electrostatic charge applied to the powder and an opposite charge on the substrate. Once applied to the substrate, the powder is generally adhered as a film by heat fusion.

It is difficult in existing powder spray systems to convert from one powder to another or from one color powder to another because of the difficulty of purging the system of the first powder. Liquid spray systems overcome the problem by simply purging the system of the first spray with a liquid solvent prior to spraying the second liquid material. Dry powder systems, though, cannot tolerate a liquid in the system so that the problem of purging the system of a first spray prior to initiation of a cycle spraying a second material is relatively severe. The problem is particularly acute when changing from one color material to another in which case even a minute amount of the first material discolors the second.

It has therefore been one objective of this invention to provide an electrostatic powder spray system which may be easily converted from one color or from one material to a second with a minimum of wasted time and material to effect the conversion. This objective has been accomplished and one aspect of this invention is predicated upon the inclusion in the system of a quick change hopper and a quick change hose connection at the gun. The quick change hopper of this invention incorporates the check valve into the bottom of the hopper which is automatically opened when the hopper is placed upon a hopper support and is automatically closed when the hopper is lifted from the support. The quick change hose connection comprises a clamp in the handle of the gun into which one end of the hose may be inserted and locked. A pivoted cover member of the handle is secured to the hose when closed. These two quick change features materially reduce the time and wasted material required to change from one color or material to another.

Still another area of difficulty encountered in electrostatic powder spray systems is that of maintaining an optimal inter-relationship between the flow of solid particulate material and the flow of air to create a suction and pull the particulate material from a hopper and then subsequently transport it at a minimum velocity to the nozzle orifice of the gun. Optimally, the velocity of the air is just sufficient to transport the solid powder to the nozzle orifice in an evenly distributed flow stream without imparting undue velocity to the solid powder. If the powder emerges too rapidly from the nozzle orifice, it fails to pick up the electrical charge and be transported onto the substrate or article to which it is being applied. Instead its inertia and velocity carry it past the article. On the other hand, if the velocity of the air stream is too low the solid particulate material falls out in the air stream during conveyance to the nozzle with the result that the stream puffs during emergence from the nozzle. In other words the solid particulate material falls out of the stream into a pile and then is periodically picked up and ejected from the nozzle as a puff of spray of greater than normal or average density.

It has therefore been an objective of this invention to provide a powder spray system in which the rate of flow of solid powder may be varied through a wide range while still maintaining the optimal flow characteristics of the system and while avoiding either puffing of the system or excessive velocity of the solid particulate material. In the preferred embodiment of the invention, the spray system is operable to vary the flow rate of material from approximately 10 pounds of material per hour to 60 pounds per hour while still maintaining very nearly optimal spray characteristics, i.e., even flow of powder material from the nozzle without excessive powder velocity as the powder emerges from the nozzle. This objective is accomplished and another aspect of this invention is predicated upon the use of a metering air flow directed radially inwardly into the material flow stream adjacent the discharge opening of the material hopper. This metering air flow is directed radially into the flow stream through an annular channel opening into the stream with the result that by varying the flow of air into the annular channel, it is possible to accurately control the even flow and distribution of powder from the hopper into a pneumatic conveyer from whence it is transported to the spray gun.

Still another aspect of the invention which facilitates this optimal flow characteristic of powder material without puffing and without excessive material velocity is predicated upon the discovery that by maintaining the vibration of the hopper as a function of the air flow through the pneumatic conveyer, optimal flow characteristic may be maintained through a wide range of flow rates. To this end a single regulator controls the flow of air to a pneumatic vibrator and to the pneumatic conveyer so that the suction operating to pull material from the hopper is a function of and is directly proportional to the rate of vibration of the hopper.

Still another aspect of this invention is predicated upon a novel pneumatic flow control circuit for controlling the flow of air or gas in the pneumatic conveyer line. This control circuit includes a pneumatically controlled electric switch for turning on the flow of air and powder to the dispensing gun of the system and the flow of electrical potential to the electrostatic charging antenna of the gun. This pneumatic flow switch includes a gun trigger actuated pneumatic valve, which valve is normally open and permits the flow of air through the gun when the trigger is not actuated and the gun is turned off. When the gun is actuated and turned on by pulling the trigger, the trigger-actuated valve is closed, thereby causing a second pneumatic valve to close the electrical switch which turns on the flow of air to the pneumatic conveyer and the electrical potential to the powder-charging needle of the gun. By closing the trigger-actuated valve when the gun is turned on and maintaining it in the open condition when the gun is turned off, there is no air flow around the gun when it is on to disturb and create turbulence which has a detrimental influence upon the flow of powder from the gun to the article. In other words, the valve is open and air flows from the trigger-actuated valve only when the gun is not in use.

Still another aspect of this invention is predicated upon a novel pneumatic-electric control switch for controlling the electrical circuit for actuating the system and for supplying an electrical potential to the charging antenna of the gun. In one preferred embodiment this switch comprises an air entrained magnet, an air entrained magnetic shield, and a reed switch for actuating the control circuit to control the flow of electrostatic charge to the gun.

Still another aspect of this invention is predicated upon a new and improved spray pattern adjustment which enables the shape of the powder spray pattern emerging from the gun to be varied and the powder to be substantially separated from the transport air without undesirable decrease of the air stream velocity prior to emergence from the gun. Most powder systems utilize a horn located in the air stream passage at the nozzle orifice to cause the powder to be ejected in a generally hollow cone-shaped pattern. The horn located at the center of the nozzle orifice has the effect of causing the emerging powder to diverge from the center outwardly into the cone-shaped pattern. To vary the angle of deflection of powder emerging from the nozzle orifice, it has been the practice to move the horn relative to the passage so as to increase or decrease the size of the nozzle orifice and thereby vary the shape of the powder pattern emerging from the nozzle. We have found that this has the detrimental effect of varying the flow characteristics of the powder emerging from the gun and of simultaneously changing both the powder velocity and the pattern. Optimally, though, the pattern should be changeable without varying the internal flow characteristics. To that end the invention of this application incorporates a slide mounted in the end of the barrel to which the horn is fixedly attached. This slide is movable within an annular flange at the end of the barrel and by adjusting the slide relative to the flange, it is possible to separately control the powder flow pattern and the air stream, shape the powder emerging from the gun and controllably dissipate the velocity of the powder as it is separated from the transport air stream and encounters the drag forces acting upon the powder particles as they pass through the still air in front of the nozzle.

One advantage of the powder spray system of this invention resides in the speed with which it may be converted from one material or one color of material to another without a substantial waste of material during the conversion. Additionally, this spray system has the advantage of a wide range of flow rates while maintaining optimal flow characteristics and a minimum or lack of puffing of the material as it emerges from the nozzle of the gun.

These and other objects and advantages of this invention will be more readily apparent from the following description of the drawings in which.

Figure 1:
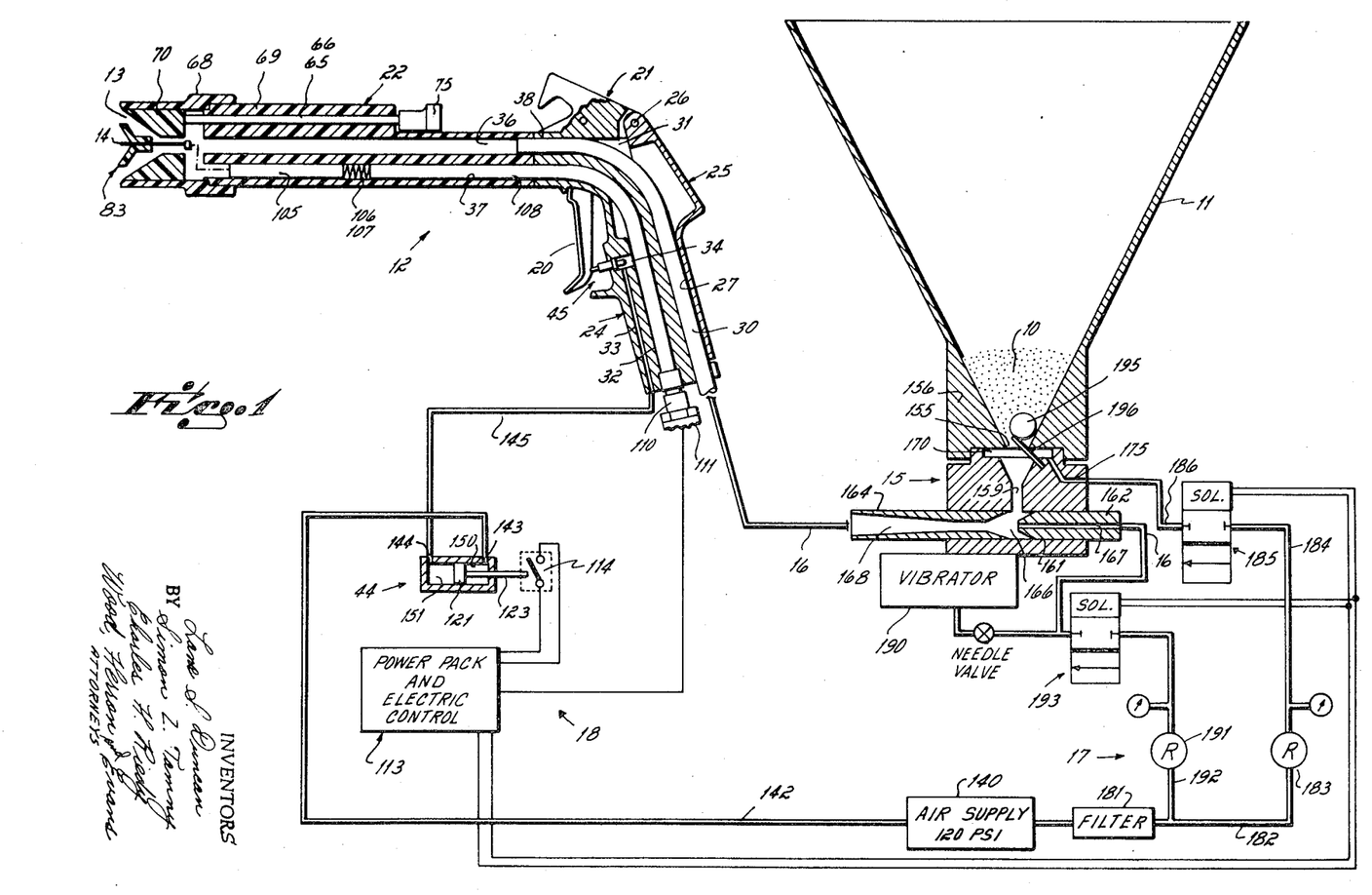
FIG. 1 is a diagrammatic illustration of an electrostatic powder spray system incorporating the invention of this application.

Referring first to FIG. 1, there is illustrated a powder spray system which incorporates the invention of this application. This system is operable to transport a fine powder 10, generally on the order of 150 mesh or smaller, from a hopper 11 to and through an electrostatic dispensing gun 12. As the air entrained powder emerges from an annular outlet orifice 13 of the gun, it picks up an electrostatic charge from a corona discharge field of an antenna 14. This charge then propels the powder from the gun to an article or substrate having an opposite charge. Generally, the charge applied to the powder is a negative one and the article is grounded. As a result of these opposite charges the powder is attracted and adheres to the surface of the article. Generally, the article is spaced a distance of approximately 18 inches from the nozzle 13 of the gun.

The system depicted in FIG. 1 is applicable to spraying any number of commercially available powders and is not intended to be limited to any particular powder. At the present time a great number of powders are available commercially, as for example, cellulostics, vinyls, epoxies, polyethylenes, thermoplastic polyesters, nylons, and phenolics. The choice of powder is determined by the characteristics of the film desired after the powder is heat fused to the substrate or article.

The powder spray system, in addition to the hopper 11 and gun 12, comprises a metering block 15, a pneumatic conveyer line 16, a pneumatic flow control circuit designated generally by the numeral 17, and an electrical antenna charge control circuit indicated generally by the number 18.

ELECTROSTATIC DISPENSING GUN

Figure 2:
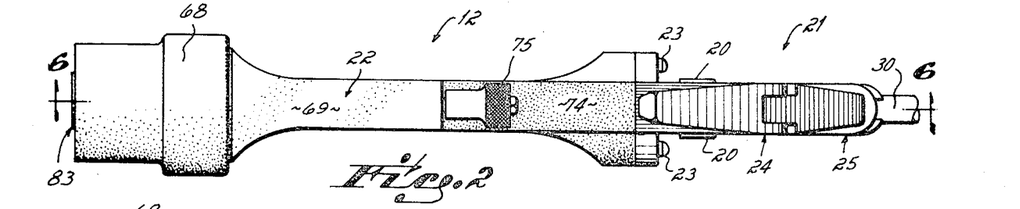
FIG. 2 is a top plan view of the gun of FIG. 1.

The gun 12 illustrated in FIG. 1 is shown in greater detail in FIGS. 2-8. The preferred embodiment illustrated in the drawings is a manually operated gun, the discharge of which is controlled by a trigger 20. This invention, though, is equally applicable to systems having automatically actuated guns as well as manually operated ones. The gun 12 comprises a cast metal handle 21 to which is attached an electrically nonconductive plastic barrel 22. The barrel is secured to the handle by screws 23 (FIG. 2).

Figures 3, 4, 5:
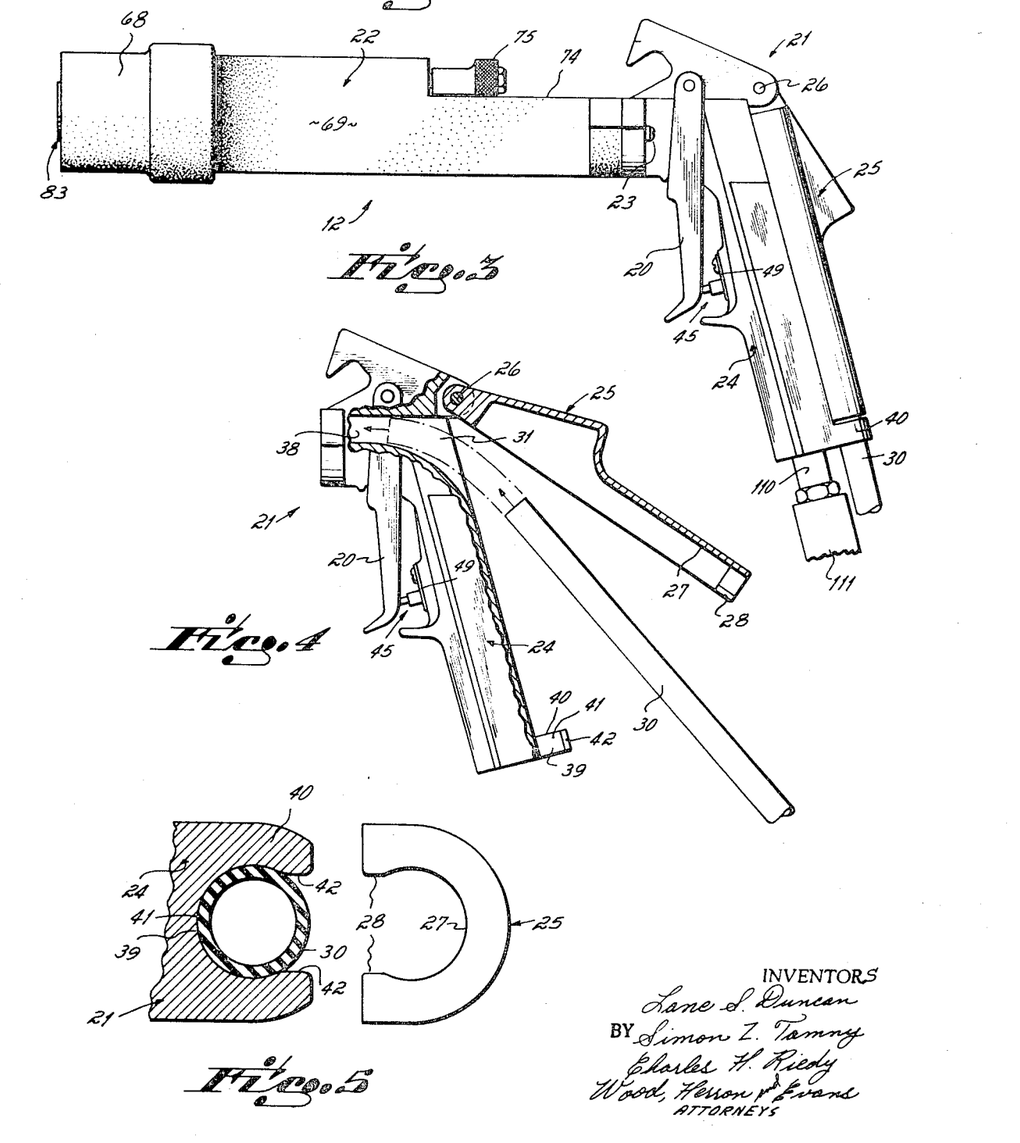
FIG. 3 is a side elevational view of the gun of FIG. 1.
FIG. 4 is a side elevational view of the handle of the gun of FIG. 3 but with the hose clamp in the open position.
FIG. 5 is a cross sectional view through a portion of the hose clamp of the handle of FIG. 4.

The handle of the gun is made in two sections, a main body 24 and a hose cover 25. The hose cover forms the rear surface of the handle and is pivotally secured at its upper end to the body 24 by a pivot pin 26. As may be seen most clearly in FIGS. 4 and 5, the hose cover has an arcuate inside surface 27 which extends through an arc of approximately 240° and defines an interior opening 28 (FIG. 5). This arcuate section is adapted to receive and be secured to the end of a hose 30 of the pneumatic conveyer 16 in the end of the gun. By clamping over a 240° arcuate section of the resilient plastic hose and utilizing an opening 28 of less width than the diameter of the hose, the resiliency of the hose may be relied upon to lock the cover 25 over the hose.

In addition to the hose-receiving passage 31 in the handle of the gun, there is a parallel electrical lead-receiving passage 32 and an air vent passage 33 in the handle 21 of the gun. The air vent passage 33 terminates in a transverse counterbored aperture 34 which is open to the front side of the handle.

Both the hose-receiving passage 31 and the electrical lead-receiving passage 32 extend completely through the handle of the gun and are open at the front of the handle body 24. Both of these passages 31 and 32 open into aligned passages 36 and 37 of the barrel 22 so that the barrel passages 36 and 37 form continuations of the handle passages 31 and 32, respectively.

In order to secure the hose 30 in the handle of the gun, its upper end is forced into the forwardly extending section 38 of the passage 31. A lower section 39 of the hose is forced into a yoke-shaped extension 40 on the bottom of the handle which also has an arcuate recess 41 extending through an arc of approximately 240°. The resiliency of the hose 30 enables it to be forced into the arcuate recess 41 through an opening 42 of less width than the outside diameter of the hose. The yoke 40 holds the hose in the gun handle. The cover 25 is then pivoted downwardly and clamped to the hose 30. To replace the hose 30 with another, all that is required is to lift the cover 25, pull the hose from the handle passage 31, insert a new hose, and close the cover. This is convenient to enable the system to be converted from spraying one material or color of material to another without going through a long time delay and waste of powder material to purge the hose of the former material.

Figures 6, 7, 8:
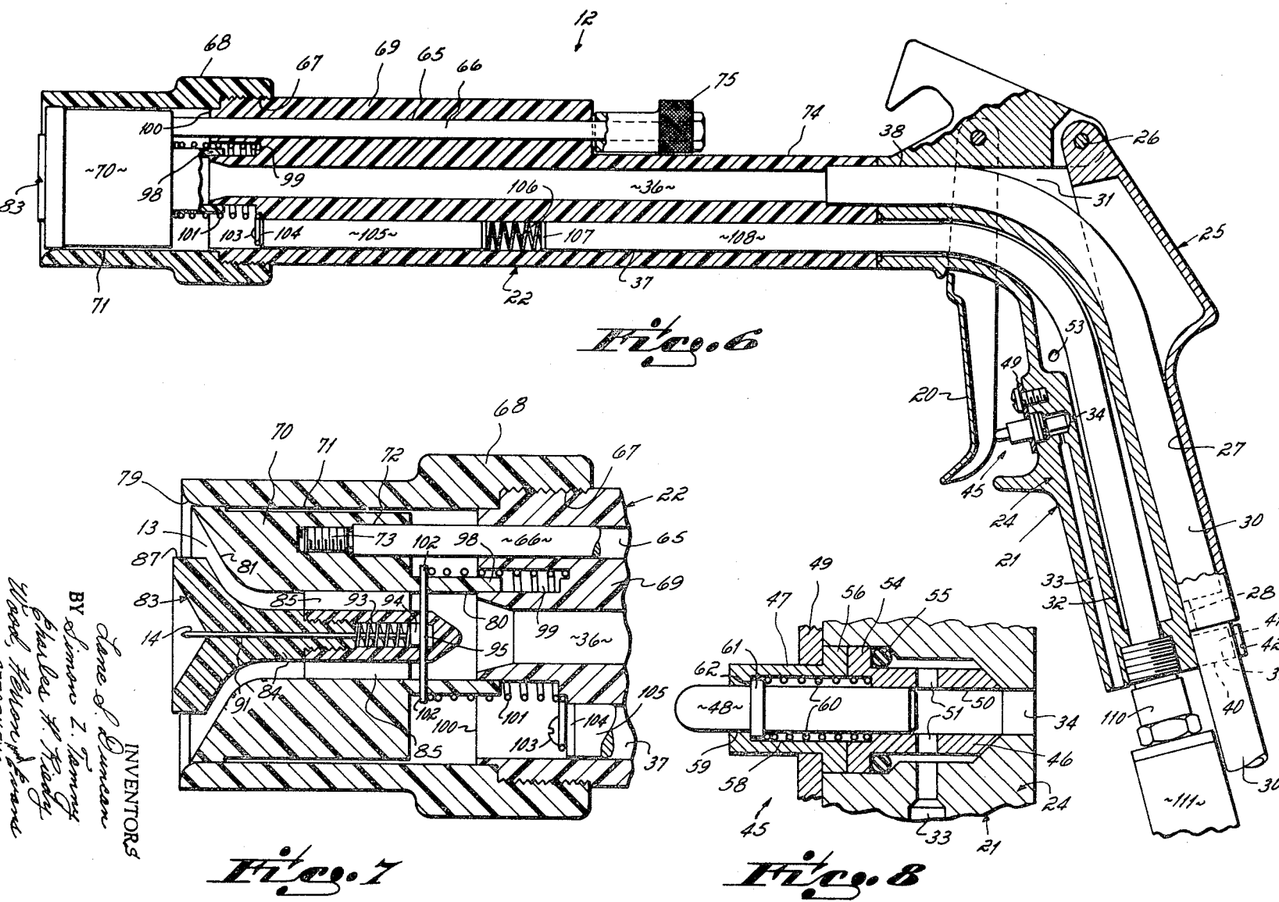
FIG. 6 is an enlarged cross sectional view through the gun taken on line 6—6 of FIG. 2.
FIG. 7 is an enlarged cross sectional view of the end of the barrel of FIG. 6.
FIG. 8 is an enlarged cross sectional view through the trigger-actuated control valve of the gun.

Referring now to FIGS. 6 and 8, it will be seen that a pneumatic flow control valve 45 is mounted within the transverse bore 34 of the gun handle 21. As is explained more fully hereinafter, this normally open valve controls the flow of air through the handle passage 33 and indirectly, through another air valve 44, the flow of powder 10 to the gun and the flow of electrical potential to the gun antenna. This valve 45 comprises a body 46 and a cap 47 within which a spring biased plunger 58 is movable. The valve is held in the gun by a retainer plate 49.

Referring now to FIG. 8, it will be seen that the body 46 of the valve 45 has an axial bore 50 intersected by a transverse bore 51. The transverse bore 51 is open to the handle passage 33 so that in the open position of the valve air may flow through the passage 33 into and through the bores 51, 50. The bore 50 in turn opens into the electrical lead passage 32 of the handle which is in turn open through a hole 53 to the exterior of the gun. At its forward end the body 46 has a lateral flange 54 which fits against and seals an O-ring 55 in the counterbored passage 34.

The cap 47 also has a radial flange 56 which fits against the body flange 54 and holds the valve body 46 in the bore. On its forward side this flange 56 is engaged and secured within the handle of the gun by the retainer plate 49. The cap 47 has a stepped axial bore 58 extending through it, the forwardmost end 59 of which is of less diameter than the rear section. The valve-actuating plunger 48 is movable within the bore 58 of the cap and in the coaxial bore 50 of the valve body. A spring 60 in the valve abuts a lateral flange 61 of the actuator so as to hold the actuator in a position in which the flange 61 abuts against a shoulder 62 of the cap and holds the valve open.

When the trigger 20 is pulled rearwardly it engages the forwardmost end of the plunger 48 and pushes it rearwardly against the bias of the spring 60. This has the effect of closing the passage 51 in the body of the valve and thereby shutting off the flow of air in the passage 33 to the handle of the gun.

In addition to the longitudinal bores or passages 36 and 37 which are coextensive with and form continuations of the handle passages 31 and 32, the barrel 22 of the gun also has a third barrel passage 65. This passage accommodates an adjustment screw 66 which, as is explained more fully hereinafter, effects spray pattern changes by varying the location of the nozzle orifice relative to a surrounding barrel flange.

At its forward end the barrel is threaded on its exterior surface, as indicated at 67, to accommodate internal threads of a nylon barrel shield 68. This shield is shaped as an annular sleeve which threads over the threads on the exterior of the barrel. It is made from the same electrically nonconductive material as is the main body section 69 of the barrel 22.

As is seen in FIG. 7, a nylon spray pattern adjusting block or slide 70 is slideably mounted within a cylindrical internal surface 71 of the shield 68. This slide is also made from an electrically nonconductive material and has a threaded recess 72 which opens to the rear of the slide. This recess is coaxial with the passage 65 of the barrel so as to receive a threaded end 73 of the adjusting screw 66 which extends through the barrel passage 65. The rear end of this adjusting screw extends into a recess 74 formed on the top of the barrel 22. A knurled knob 75 is fixed to the rearward extension of the screw 66 so that longitudinal adjustment of the knob 75 effects longitudinal movement of a block 70.

The adjustable block 70 has an axial aperture 80 extending through it. This aperture is coaxial with and forms a continuation of the material flow passage 36 of the barrel. At its forward end the passage 80 tapers outwardly, as indicated at 81, so as to permit material exiting through the passage to diverge as it passes outwardly through the tapered section. To insure that it diverges in passing outwardly, a Teflon horn 83 is mounted in the passage 80. This horn 83 consists of a cylindrical center section 84 supported within the axial aperture 80 by spaced spiders 85 which extend radially outwardly from the cylindrical section. The outer edges of the spiders abut and rest against the inside surface of the passage 80. The rear edges taper to a knife edge so as to preclude powder material from collecting on the edge and periodically emerging from the nozzle orifice as a puff of powder.

At its outer end the cylindrical section 84 diverges outwardly so as to form the generally conical-shaped outer end or horn 83 on the end of the cylinder. This horn partially blocks the passage 80 and forces all air entrained powder exiting through the passage 80 to flow outwardly through the annular channel 13 located between the outer peripheral surface 87 of the horn and the inside tapered surface 81 of the adjustable block 70.

To shape and control the diameter of the emerging conically-shaped pattern of air entrained powder which exits through the annular passage 13, the block 70 and rigidly attached horn 83 are movable axially inside the barrel shield 68. By moving the block inwardly within the shield 68, the emerging pattern is reduced in diameter. Conversely, by moving it outwardly relative to the shield, the emerging pattern may be made to expand or increase in diameter at a point some fixed distance from the annular nozzle orifice 68. During the adjustment, though, the annular nozzle orifice 13 remains of a fixed flow area so that no change in air stream or powder velocity results from the adjustment. Thus, this adjustable nozzle structure enables the pattern to be adjusted without disturbing an optimal air flow velocity.

Referring now to FIG. 12, there is illustrated the flow pattern of the air stream 76 and the powder, depicted by arrows 77 and 78, in various positions of adjustment of the block 70. When the block 70 is fully extended, as depicted in FIG. 7, the powder entrained air stream emerges from the orifice 13 without any interference by the annular flange of the shield 68. However, as the block 70 is moved through the various positions of adjustment, two of which are depicted in solid and phantom lines in FIG. 12, the radiused outer end 79 at the end of the shield has an increasing effect in separating the powder flow from the air flow and in simultaneously focusing the powder flow as shown by arrows 77 and 78 inwardly toward the barrel axis.

We have discovered and one aspect of this invention is predicated upon the discovery that over the short path lengths encountered in a spray nozzle there are two substantially independent flow regimes, i.e., the air flow and powder flow may be treated separately because of the differing flow characteristic of the powder and air. The air flow maintains normal shaped hydraulic flow and boundary layer characteristics while the powder essentially maintains inertial straight line motion characteristics similar to optical light patterns with substantially equal angles of incidence and reflection when the powder strikes an obstruction. By pushing the block 70 forwardly to its full extent of adjustment as shown in FIG. 7, the powder may be maintained entrained in the air stream as it is ejected from the nozzle orifice 13 in the outward direction established by the controlling surface boundaries of the orifice 13. However, as the block 70 is pulled rearwardly, the shield 68 is brought into the line of flow of the powder and the impingement of the powder against the desired surface angle of the radius 79 enables the angle of reflection of the powder to be varied, as shown by the arrows 77 and 78 while the air 76 continues to flow generally outwardly away from the powder. With the main stream of air separated, bouncing the powder off the radiused end of the shield focuses the powder inwardly and the inertia and velocity of the powder are reduced to the optimum coating velocities by the drag forces acting on the powder particles as they pass through the still air between the gun and the object to be coated.

An electrical charge is applied to air entrained powder as it emerges from the annular orifice 13. This charge is applied to the powder in the course of its passing through a high potential corona field created at the end of the needle antenna 14. This antenna protrudes from the end of a recess 91 in the end face of the horn 83 and extends rearwardly into a hollow chamber 93 contained within the horn. The antenna 14 is of course electrically conductive and terminates in an electrically conductive head 94 located within the hollow chamber 93. The head 94 of the antenna is biased against a metallic electrically conductive pin 95 which extends transversely through the horn and through transverse apertures of an inwardly extending flange 98 on the rear of the slide block. This flange 98 is slideable within an annular channel 99 machined from the end face 100 of the barrel. A compression spring 101 extends between the inner end of the annular channel 99 and protruding ends 102 of the pin 95. The innermost end of the spring 101 extends radially outwardly and is secured by a screw 103 to an electrical conductor 104. This conductor is in electrical contact with the end of an electrical resistor 105. The resistor 105 is a conventional high impedance current limiting resistor which operates to limit any current flowing through the resistor.

At its opposite end the resistor 105 is contacted by the end of an electrically conductive spring 106, the opposite end of which contacts an electrically conductive washer 107. The washer 107 is in turn connected to a conductor of an insulated electrical lead 108 which extends into the passage 37 of the barrel from the passage 32 of the handle. At the end of the handle the insulated electrical conductor 108 is connected by a fitting 110 to a grounded and shielded cable 111. This grounded and shielded cable 111 connects the electrical conductor contained within the insulated wire 108 to a source of high voltage potential or a so-called "power pack" 113 (FIG. 1). When an electrical switch 114 of the pneumatic flow control valve 44 is closed it causes the high voltage source of electrical potential from the "power pack" 113 to be connected to the antenna 14 of the gun through a conductor in the grounded and shielded cable 111, the spring 106, the resistor 105, the spring 100, the pin 95, and the head 94 of the antenna 14.

ELECTRICAL AND PNEUMATIC CONTROL CIRCUITS

The flow of electrical potential to the antenna of the gun is controlled by the switch 114 and the electrical charging circuit 18 including the pneumatic flow valve or switch 44 and the trigger-actuated pneumatic flow control valve 45.

The flow control switch 44 is shown in detail in FIG. 10. Basically, it comprises a cylinder 120 within which a piston assembly 121 is slideable. This piston assembly 121 is mounted upon a piston rod 122, the end 123 of which extends through an aperture 124 in the end of the cylinder and engages a switch actuator 125 of the electrical switch 114. The switch 114, as illustrated in FIG. 1, is normally open and is only caused to close upon rightward movement of the piston 121 and attached piston rod 122.

The piston assembly 121 comprises a front disc 127 having a hub 128 mounted over a small diameter rear section of the piston rod 122. This hub supports an annular ring 129 which is held on the hub by a nut 130 and washer 131. The nut 130 is threaded over a threaded rear end section 132 of the piston rod. A pneumatic seal 133 is sandwiched between the disc 127 and the annular ring 129. On the front side of the piston assembly 121 there is a transverse passage 135 in fluid communication with an axial passage 136. The latter passage 136 terminates in a radial slot 137 in the end of the piston so that the opposite sides of the piston are in fluid communication through the transverse slot 135, the axial passage 136, and the radial slot 137.

Air is supplied to the cylinder from a source of air pressure 140 (FIG. 1) via an air line 142 and a cylinder inlet port 143 located on the forward side of the piston. Air exits from the cylinder on the rear side of the piston through an exit port 144 and an air line 145 which connects the exit port 144 to the passage 33 in the handle of the gun.

In operation, when the gun is not in use and the trigger is not actuated, the valve 45 is open so that air may pass through passage 33 in the handle of the gun through the valve 45 to the passage 32 and out through the exit 53. In this condition of the gun, air flows from the source of air pressure 140 through the air line 142 into the port 143, through the passages 135,136 and 137 in the piston and piston rod, and out the port 144 through the line 145 and the handle passage 33. Thus, in this condition of the gun, the air flow maintains the piston assembly 121 in its leftwardmost position in FIGS. 1 and 10 so that the electrical switch 114 is maintained open.

When the trigger 20 of the gun is pulled rearwardly to turn on the gun, it causes the valve 45 to close the passage 33. This results in a termination of air flow into the port 143 and out the port 144 of the air flow valve. When this occurs, the air pressure quickly equalizes in the chambers 150 and 151 on opposite sides of the piston assembly 121. Because of the greater effective piston area on the left side of the piston, it moves to the right when the pressures are equalized and thereby closes the switch 114. This has the effect of turning on powder entrained air flow through the gun by actuation of solenoid valves 193, 185 (as explained more fully hereinafter) and of completing an electrical circuit connecting the power pack 113 to the antenna 14 of the gun. A high potential electrical field is thereby created around the antenna through which the powder must pass in emerging from the orifice 13 of the gun.

Figures 9, 10, 11, 12:
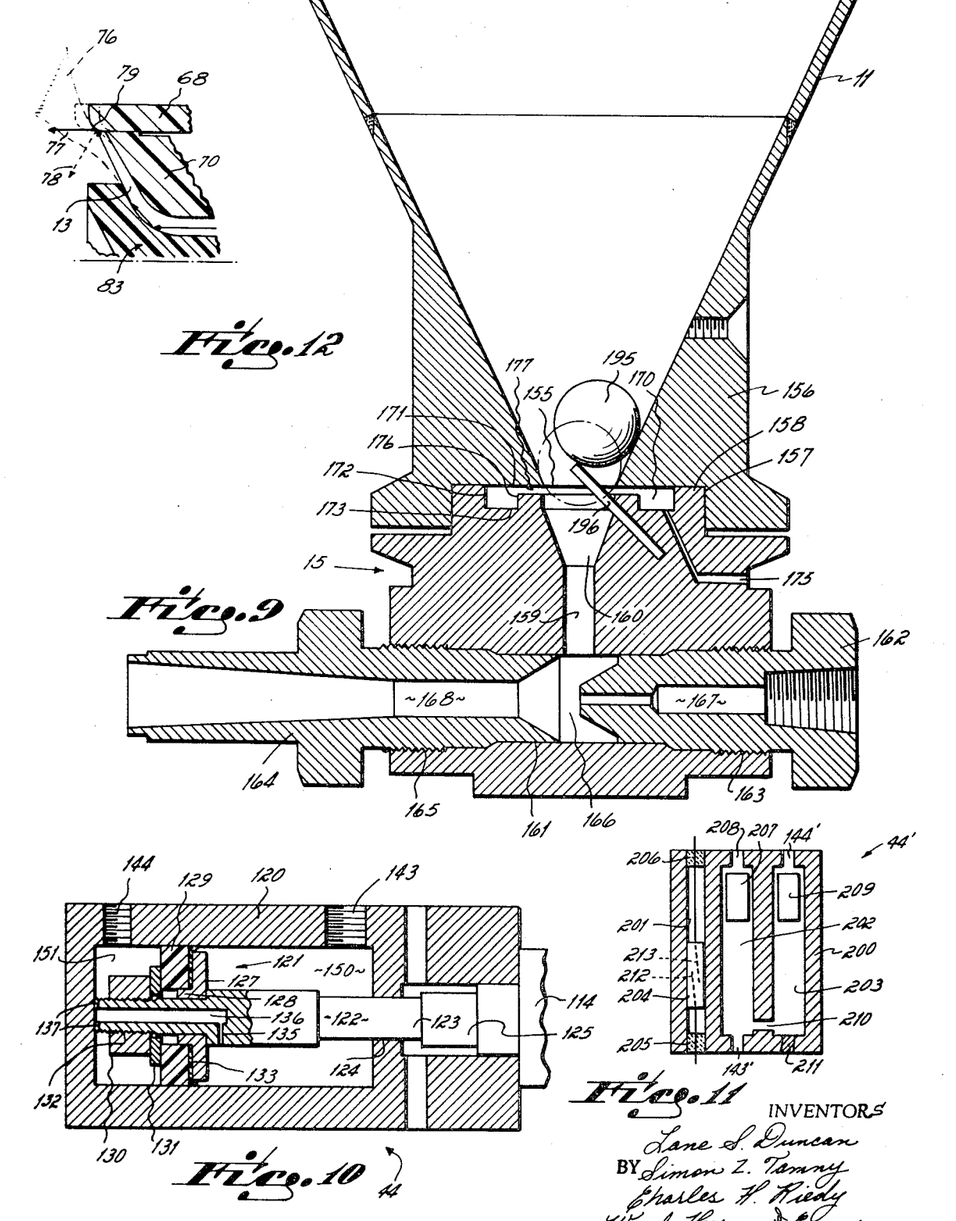
FIG. 9 is an enlarged cross sectional view through the bottom of the hopper and the metering block of the system of FIG. 1.
FIG. 10 is a cross sectional view through the flow control switch of FIG. 1.
FIG. 11 is a cross sectional view of an alternative flow control switch.
FIG. 12 is a partially diagrammatic sketch of the gun nozzle adjustment illustrating the manner of separation of the air flow and powder flow.

It is important to note that in the absence of air flow from the pressure source 140 to the flow control switch 44, the electrical switch 114 remains open. In the absence of such air flow, a spring (not shown) of the electrical switch 114 maintains the actuator 125 of the switch in the leftwardmost position as shown in FIG. 10 and thus holds the switch 114 open. Thus, there is no electrical charge on the antenna 14 of the gun in the absence of air pressure at the source 140 and/or air flow in the line 142.

Referring now to FIG. 11, there is illustrated still another embodiment of a flow control switch for accomplishing the function of the flow control switch 44 of FIG. 1. The structural components of this switch have been designated by numerals identical to their functional counterparts of the switch 44 followed by a prime designation. This flow control switch 44' comprises an aluminum housing 200 through which there extend three parallel passages 201, 202, and 203. The first passage 201 contains a magnetic reed switch 114' enclosed within a glass casing 204. This switch is held in the passage 201 by potting 205 and 206. The second passage 202 functions as a slideway for a magnetic shield 207 which is sufficiently light that an air stream flowing in the inlet port 143' at one end of the passage 202 and out the opposite end port 208 lifts the shield and raises it against the force of gravity from its lower position (in which it is located in the same horizontal plane as the reed switch 114') to a position above and out of that horizontal plane.

The third passage 203 functions as a slideway for a magnet 209 and is in fluid communication with the passage 202 via a transverse passage 210 which interconnects the two. At its lower end the passage 203 is closed by a plug 211. The opposite or upper end of the passage terminates in a port 144' which is connected through an air line 145 to the trigger-actuated air flow gun 45.

In operation, air flows from the source 140 into the inlet port 143' and out through both the vent port 208 and the outlet port 144'. This air flow is effective to lift the magnetic shield 207 and the magnet 209 against the force of gravity upwardly to the positions depicted in FIG. 11. The magnet and shield both remain in this raised position so long as the air valve 45 of the gun is open. When the trigger 20 of the gun is actuated, though, and the valve 45 closed, air flow through the passage 144' is terminated; but the flow continues through the passage 202 and the vent port 208. Consequently, the magnet 209 drops downwardly into the horizontal plane of the magnetic reed switch 114', in which position the magnetic field of the magnet is operable to influence the ferrous metal blades 212 and 213 of the reed switch and to close those blades. Closing of the switch 114' turns on the power pack 113 to the antenna 14 and simultaneously energizes the solenoids of the solenoid valves 185 and 193. So long as the trigger-actuated valve 45 remains closed, the magnetic switch 114' remains closed. When the valve 45, though, is again opened the air flow pattern from the inlet port 143' to port 144' is re-established and the magnet 209 is lifted to remove its magnetic field from the blades of the reed switch 114' and the switch is thereby opened.

In the event that air pressure from the source 140 is turned off or is interrupted, both the magnet 209 and the magnetic shield 207 fall into the lower position in which they are both located in the horizontal plane of the reed switch 114'. In this condition of the switch 44', though, the shield 207 effectively blocks the magnetic field of the magnet 209 from influencing and closing the blades of the reed switch 114'. Thus the switch is fail-safe in the sense that it remains open whenever there is no flow of air through the switch 44'.

HOPPER AND PNEUMATIC CONVEYOR

As can best be seen with reference to FIG. 9, the hopper 11 is generally funnel-shaped and terminates at its lower end in a discharge orifice 155. This orifice is located in a support block 156 attached to the bottom of the funnel-shaped hopper 11. The bottom of the block 156 has a circular recess 157 machined from it which fits over an annular ring 158 on the top of the metering block 15. Spaced inwardly from the annular ring 158 on top of the metering block, there is a Teflon lined discharge passage 159 extending vertically through the metering block. This discharge opening diverges outwardly into a generally funnel-shaped opening 160 in the top of the metering block 15.

A traverse bore 161 extends through the metering block 15 and is in fluid communication with the vertical passage 159 of the metering block. On one side of the intersection of the passage 159 and the transverse bore 161, there is an inlet nozzle 162 threaded into a threaded section 163 of the bore 161. On the opposite side of the intersection of the passage 159 with the bore 161, there is a Teflon outlet tube 164 threaded into a threaded section 165 of the bore 161. Between the inlet nozzle 162 and the outlet tube 164, there is a region 166 in the bore in which a vacuum is created by air passing through an axial passage 167 of the nozzle 162. So long as air at a pressure above that of the atmosphere passes through the nozzle, it causes the pressure in the region 166 to be maintained at a pressure below that of the atmosphere so that solid particulate powder material 10 contained within the hopper is pulled downwardly through the passage 159 by the vacuum and is forced outwardly through an axial orifice 168 in the outlet tube 164 while entrained in the air stream. The flow of air through the nozzle is maintained at a level which creates the desired vacuum necessary to achieve a desired flow of solid powder material through the gun and to carry that powder through the gun while maintaining it entrained in the air stream. Ideally, the air flow is just sufficient to transport the powder to the annular outlet orifice of the gun without allowing the powder to drop out of entrainment but without directing the powder with any substantial velocity away from the gun nozzle orifice 13. From the orifice to the object upon which the particulate powder material is being deposited the electrical charge applied to the powder carries it as a result of the electrostatic attraction between the oppositely charged powder and the article.

To control and meter the quantity of powder injected into the air stream, there is an annular channel 170 defined between the bottom surface 171 of the hopper, the vertical surface 172 of the annular ring 158, and the top surface 173 of the metering block. Air at a regulated pressure is spplied to this annular channel 170 via a restricted passage 175 in the metering block. As seen in FIG. 1, this passage 175 is in fluid communication with the source of air pressure 140 through an air filter 181, an air line 182, a pressure regulator 183, an air line 184, a solenoid-controlled valve 185, and an air line 186. In order to direct the flow of control air from the annular channel 170 into the passage 159, an annular flange 176 protrudes upwardly from the top of the metering block within the channel 170. This flange defines an annular metering orifice 177 through which a curtain of powder metering air is injected into the passage 159.

In order to further regulate the flow of powder through the metering block 15 and prevent compacted powder from blocking flow through the hopper discharge opening 155 and the powder flow passages of the metering block, there is a conventional pneumatic vibrator 190 located beneath the metering block. The metering block and the hopper supported on top of it are in turn supported upon resilient cushions of a stand (not shown) so that vibration imparted to the metering block 15 by the vibrator 190 is effective to shake both the metering block and the hopper at a frequency controlled by the pressure of the air stream supplied to the vibrator. That pressure is in turn controlled by a regulator 191 located in an air line 192 which is connected to the air line 182. The line 192 is in turn connected to the vibrator through a solenoid valve 193. This same solenoid valve 193 controls the flow of air to the inlet nozzle 162 of the pneumatic conveyer circuit 16. Because both the vibrator and the pneumatic conveyer line 16 are connected to the source of air pressure 140 through a single regulator 191, a change of air pressure to one effects a simultaneous change of air pressure to the other. Thus, the rate of vibration of vibrator 160 is always maintained directly proportional to the pressure in line 16 and the vacuum created in region 166 to effect flow of powder from the hopper.

In addition to the quick change hose connection at the gun 12, the system of this application also includes as a part of the system an arrangement for facilitating quick changes of the hopper 11. Generally, at the end of a spray cycle or termination of the use of the system to spray one material or color of material and before initiation of a spray cycle using a different material there is powder left in the hopper 11. This powder material 10 must be purged from the system before a new powder material may be sprayed. To facilitate a quick color or material change, each hopper 11 includes a ball 195 of a diameter greater than the diameter of the discharge orifice 155 in the bottom of the hopper. This ball is sufficiently heavy and dense that it will move to the bottom of the hopper when the hopper is full of powder material and close the discharge opening. Consequently, when the hopper is lifted from its support on the metering block 15, the ball moves into the discharge opening and closes it. To open the discharge opening and move the ball away from its seat in the bottom of the hopper, there is a metal pin 196 mounted in the metering block which extends up into and through the discharge opening 155 of the hopper. This pin moves the ball upwardly to unseat it when the hopper is placed on top of the metering block. When the hopper is lifted away, though, the ball check automatically closes the discharge opening.

The quick change hose connection of the gun and the quick change hose connection on the hopper enable the system to interchangeably spray different materials with a minimum of lost time and spray material. By changing the material hoses 30 and the hopper 11, all of the system that remains to be purged of the old material is the metering block and its venturi passage as well as the flow passage of the gun.

While we have described only a single preferred embodiment of our invention, persons skilled in the art to which this invention pertains will readily appreciate numerous changes and modifications which may be made without departing from the spirit of our invention. For example, we have described the system as one in which air is the fluid medium employed for transporting the powder from the hopper to the gun. Obviously, though, other gases which are inert with the powder may be employed with equal facility. Therefore, the terms "air" and "pneumatic" are intended and are used throughout the specification and claims in a generic sense to include all suitable gases. Other changes and modifications will also readily come to mind in the case of persons skilled in this art. Therefore, we do not intend to Having described out invention, we claim:

1. An electrostatic spraying system for spraying solid particulate powder material comprising
   a hopper having a bottom discharge opening through which powder material may flow outwardly from said hopper,
   a pneumatic conveyer line,
   a flow passage extending between and interconnecting said pneumatic conveyer line and said hopper discharge opening,
   said pneumatic conveyer line including means for creating a region of substantial vacuum in the area of intersection of said pneumatic conveyer line with said flow passage whereby powder material may be drawn through said metering passage into said pneumatic conveyer by the vacuum created in said region,
   electrostatic spray means in fluid communication with said pneumatic conveyer line,
   means for supplying gas at a pressure above that of the atmosphere to said pneumatic conveyer line, and
   the improvement which comprises metering means for controlling the rate of flow of solid particulate material from said hopper into said flow passage, said metering means comprising means located remote from the area of intersection of said pneumatic conveyer line and said flow passage for directing a curtain of gas at a pressure above that of the atmosphere radially into said passage in a direction generally normal to the direction of flow of solid particulate flow through said passage.

2. The electrostatic spray system of claim 1 in which said metering means includes an annular chamber opening into said flow passage and means for supplying gas at a pressure above that of the atmosphere to said chamber.

3. An electrostatic spraying system for spraying solid particulate powder material comprising
   a hopper having a bottom discharge opening through which powder material may flow outwardly from said hopper,
   a pneumatic conveyer line,
   a flow passage extending between and interconnecting said pneumatic conveyer line and said hopper discharge opening,
   said pneumatic conveyer line including means for creating a region of substantial vacuum in the area of intersection of said pneumatic conveyer line with said flow passage whereby powder material may be drawn through said metering passage into said pneumatic conveyer by the vacuum created in said region,
   electrostatic spray means in fluid communication with said pneumatic conveyer line,
   means for supplying gas at a pressure above that of the atmosphere to said pneumatic conveyer line, and
   metering means for controlling the rate of flow of solid particulate material from said hopper into said flow passage, said metering means comprising an annular channel surrounding and opening into said flow passage adjacent said hopper discharge opening and means for supplying gas at a pressure above that of the atmosphere into said channel, said annular channel being located remote from said area of intersection of said pneumatic conveyer line with said passage.

4. The electrostatic spraying system of claim 3 which further includes a pneumatic vibrator means and a single regulating means for simultaneously varying the air pressure to said pneumatic conveyer line and to said vibrator means.

5. The electrostatic spraying system of claim 3 in which said electrostatic spray means includes
   an electrostatic spray gun having a pneumatic-powder transfer conduit in fluid communication with said pneumatic conveyer line, said conduit terminating in a discharge nozzle,
   electrostatic charging means for applying electrostatic charge to powder as it is ejected from said nozzle,
   a source of electrical potential,
   an electrical circuit including an electric switch interconnecting said source of potential to said electrostatic charging means,
   a normally open first pneumatic flow control valve in said gun,
   a manually operated trigger for closing said first valve when said trigger is actuated to initiate powder flow from said gun, and
   a pneumatic circuit for connecting a source of air pressure to said first pneumatic valve, said pneumatic circuit including a second pneumatic flow control valve, said second pneumatic flow control valve being operable to effect closing of said electrical switch and charging of said electrostatic charging means upon closing of said first pneumatic valve.

6. The electrostatic spraying system of claim 5 in which said electrical circuit further includes a solenoid of a solenoid-operated valve, said solenoid-operated valve being operable to open the flow of gas to said pneumatic conveyer line upon closing of said electrical switch.

7. The electrostatic spraying system of claim 3 which further comprises quick-change means for facilitating replacement of one hopper having one particulate powder material therein with a second hopper having a second particulate powder material therein, said quick-change means comprising a valve in the bottom of said hopper, and means for opening said valve in response to location of said hopper on said support block.

8. The electrostatic spraying system of claim 7 in which said valve comprises a ball check located in the bottom of said hopper operable to close said hopper discharge opening upon removal of said hopper from said support block.

9. The electrostatic spraying system of claim 8 in which said valve opening means comprises a fixed rigid element extending upwardly from said hopper support block.

10. The electrostatic spraying system of claim 3 which further includes a hose connecting said electrostatic spray means to said pneumatic conveyer line and quick change clamping means on said electrostatic spray means for clamping said hose to said electrostatic spray means.

11. The electrostatic system of claim 3 in which said electrostatic spray means comprises an electrostatic spray gun having an electrically non-conductive barrel, a recess in one end of said barrel, said recess being surrounded by an axially extending flange of said barrel, a slide movably mounted within said recess internally of said flange, a continuous material passage extending axially through said barrel and said adjustable slide and terminating in an outlet orifice in said slide, a spray-shaping horn fixedly secured to said slide and located in said passage adjacent said orifice, means for applying an electrical charge to powder material as it is ejected from said orifice, and means for adjusting said slide relative to said barrel flange to vary the spray pattern emerging from said material passage without changing the dimensions of said material passage at said outlet orifice.

12. An electrostatic spraying system for spraying solid particulate powder material comprising a hopper having a bottom discharge opening through which powder material may flow outwardly from said hopper, a pneumatic conveyer line, a flow passage extending between and interconnecting said pneumatic conveyer line and said hopper discharge opening, said pneumatic conveyer line including means for creating a region of substantial vacuum in the area of intersection of said pneumatic conveyer line with said flow passage whereby powder material may be drawn through said metering passage into said pneumatic conveyer by the vacuum created in said region, electrostatic spray means in fluid communication with said pneumatic conveyer line, pneumatic metering means for controlling the rate of flow of solid particulate material from said hopper, pneumatic vibrator means for vibrating said hopper to maintain a flow of powder from said bottom discharge opening, a source of air pressure, an air line connecting said source of air pressure to both said metering means and said pneumatic conveyer line, and a single regulator means in said air line for simultaneously varying the air pressure in said pneumatic conveyer line and in said pneumatic vibrator means.

13. An electrostatic spraying system for spraying solid particulate powder material comprising a hopper having a bottom discharge opening through which powder material may flow outwardly from said hopper, a pneumatic conveyer line, a flow passage extending between and interconnecting said pneumatic conveyer line and said hopper discharge opening, means for supplying gas at a pressure above that of the atmosphere to said pneumatic conveyer line, an electrostatic spray gun including a pneumatic-powder transfer conduit in fluid communication with said pneumatic conveyer line, said conduit terminating in a discharge nozzle, electrostatic charging means for applying an electrostatic charge to powder as it is ejected from said nozzle, a source of electrical potential, an electrical circuit including an electrical switch interconnecting said source of potential to said electrostatic charging means, a normally open first pneumatic flow control valve in said gun, a manually operated trigger for closing said first valve when said trigger is actuated to initiate powder flow from said gun, a pneumatic circuit for connecting a source of air pressure to said first pneumatic valve, said pneumatic circuit including a second pneumatic flow control valve, said second pneumatic flow control valve being operable to effect closing of said electrical switch and charging of said electrostatic charging means upon closing of said first pneumatic valve.

14. The electrostatic spraying system of claim 13 in which said electrical circuit further includes a solenoid of a solenoid-operated valve, said solenoid-operated valve being operable to open the flow of gas to said pneumatic conveyer line upon closing of said electrical switch.

15. The electrostatic spray system of claim 13 in which said second pneumatic flow control valve comprises a cylinder including a magnet movable within the cylinder in response to air flow therethrough, said switch being a magnetic reed switch located in proximity to said magnet such that movement of said magnet in said cylinder effects closing of said switch.

16. An electrostatic spraying system for spraying solid particulate powder material comprising a hopper having a bottom discharge opening through which powder material may flow outwardly from said hopper, a pneumatic conveyer line, a hopper support block, a flow passage extending through said block between said pneumatic conveyer line and said hopper discharge opening, electrostatic spray means in fluid communication with said pneumatic conveyer line, means for supplying gas at a pressure above that of the atmosphere to said pneumatic conveyer line, and the improvement which comprises quick-change means for facilitating replacement of one hopper having one solid particulate powder material therein with a second hopper having a second particulate powder material therein, said quick-change means comprising a valve in the bottom of said hopper, and means for opening said valve in response to location of said hopper on said support block.

17. The electrostatic spray system of claim 16 in which said valve comprises a ball check located in the bottom of said hopper operable to close said hopper discharge opening upon removal of said hopper from said support block.

18. The electrostatic spray system of claim 17 in which said valve opening means comprises a fixed rigid element extending upwardly from said hopper support block.

19. The electrostatic spray system of claim 16 which further includes pneumatic metering means for controlling the rate of flow of solid particulate material from said hopper, said metering means comprising means for directing a flow of gas radially into said flow passage.

20. The electrostatic spray system of claim 19 which further includes a pneumatic vibrator means and single regulating means for simultaneously varying the air pressure to said pneumatic conveyer line and to said vibrator means.

21. The electrostatic spray system of claim 16 in which said electrostatic spray means includes
an electrostatic spray gun having a pneumatic-powder transfer conduit in fluid communication with said pneumatic conveyer line, said conduit terminating in a discharge nozzle,
electrostatic charging means for applying electrostatic charge to powder as it is ejected from said nozzle,
a source of electrical potential,
an electrical circuit including an electric switch interconnecting said source of potential to said electrostatic charging means,
a normally open first pneumatic flow control valve in said gun,
a manually operated trigger for closing said first valve when said trigger is actuated to initiate powder flow from said gun, and
a pneumatic circuit for connecting a source of air pressure to said first pneumatic valve, said pneumatic circuit including a second pneumatic flow control valve, said second pneumatic flow control valve being operable to effect closing of said electrical switch and charging of said electrostatic charging means upon closing of said first pneumatic valve.

22. The electrostatic spray system of claim 21 in which said electrical circuit further includes a solenoid of a solenoid-operated valve, said solenoid-operated valve being operable to open the flow of gas to said pneumatic conveyer line upon closing of said electrical switch.

23. The electrostatic spray system of claim 16 which further includes a hose connecting said electrostatic spray means to said pneumatic conveyer line and quick-change clamping means on said electrostatic spray means for clamping said hose to said electrostatic spray means, said quick-change means including a pivoted clamp and means for locking said clamp in a closed position.

24. The electrostatic spray system of claim 16 in which said electrostatic spray means comprises
an electrostatic spray gun having an electrically nonconductive barrel,
a recess in one end of said barrel, said recess being surrounded by an axially extending flange of said barrel,
a slide movably mounted within said recess internally of said flange,
a continuous material passage extending axially through said barrel and said adjustable slide and terminating in an outlet orifice in said slide,
a spray-shaping horn fixedly secured to said slide and located in said passage adjacent said orifice,
means for applying an electrical charge to powder material as it is ejected from said orifice, and
means for adjusting said slide relative to said barrel flange to vary the spray pattern emerging from said material passage without changing the dimensions of said material passage at said outlet orifice.

25. An electrostatic spray system for spraying solid particulate powder material comprising
a hopper having a bottom discharge opening through which powder material may flow outwardly from said hopper,
a pneumatic conveyer line,
a flow passage extending between and interconnecting said pneumatic conveyer line and said hopper discharge opening,
an electrostatic spray gun,
a hose connecting said spray gun to said pneumatic conveyer line,
said spray gun having an electrically nonconductive barrel,
a handle secured to said barrel,
a material passage in said barrel terminating in an outlet orifice,
means for applying an electrical charge to material as it is ejected from said orifice,
an electrical resistor,
first electrically conductive connector means connecting one end of said resistor to said electrical charge applying means,
a high voltage power supply,
second electrically conductive connector means connecting said resistor to said high voltage power supply,
the improvement which comprises quick change clamping means in the handle of said gun for clamping said hose in said gun in a position in which it is in fluid communication with said material passage of said gun barrel, said quick change means including a pivoted clamp and means for locking said clamp in a closed position.

26. A nozzle for use with a spray gun for the application of powder coating material by electrostatic means in which the powder is entrained in an air stream and carried to the nozzle through a passageway, said nozzle including an orifice in which the flows of air and powder are treated as two substantially independent flow regimes, said orifice comprising
pneumatic flow path means for controlling the direction of the air flow therein in accordance with the hydraulic flow and boundary layer characteristics of the orifice, and
powder flow path means for controlling the direction of the powder flow in accordance with the impact reflection of the powder particles from the surfaces in the orifice, whereby the flow paths of the air and powder are made separately controllable.

27. The nozzle of claim 26 in which said pneumatic flow path means includes means for controlling the air flow in a substantially radially outward direction upon exit from the orifice and the powder flow path means includes means for simultaneously controlling the powder flow in a substantially forward direction upon exit from the orifice.

28. An electrostatic spray system for spraying solid particulate powder material comprising
a hopper having a bottom discharge opening through which powder material may flow outwardly from said hopper,
a pneumatic conveyer line,
a flow passage extending between and interconnecting said pneumatic conveyer line and said hopper discharge opening, means for supplying gas at a pressure above that of the atmosphere to said pneumatic conveyer line,
an electrostatic spray gun,
a hose connecting said spray gun to said pneumatic conveyer line,
said spray gun having an electrically nonconductive barrel,
a recess in the one end of said barrel, said recess being surrounded by a flange of said barrel,
a slide movably mounted within said recess internally of said flange,
a continuous material passage in said barrel and said adjustable slide terminating in an outlet orifice in said slide,
a spray shaping horn fixedly secured to said slide and located in said passage adjacent said orifice,
means for applying an electrical charge to material as it is ejected from said orifice,
an electrical resistor,
first electrically conductive connector means connecting one end of said resistor to said electrical charge applying means,
a high voltage power supply,
second electrically conductive connector means connecting said resistor to said high voltage power supply, and
means for adjusting said slide relative to said barrel flange to vary the spray pattern emerging from said material passage without changing the dimensions of said material passage at said outlet orifice.

29. An electrostatic spray gun for use in a powder spray system of the type having a hopper and a hopper discharge passage through which particulate powder material may flow into a pneumatic conveyer line, which electrostatic spray gun comprises
an electrically nonconductive barrel,
a recess in the one end of said barrel, said recess being surrounded by an axially extending flange of said barrel,
a slide movably mounted within said recess internally of said flange,
a continuous material passage extending axially in said barrel and said adjustable slide terminating in an outlet orifice in said slide,
a spray shaping horn fixedly secured to said slide and located in said passage adjacent said orifice,
means for applying an electrical charge to material as it is ejected from said orifice,
a high voltage power supply,
electrically conductive connector means connecting said electrical charge applying means to said high voltage power supply, and
means for adjusting said slide relative to said barrel flange to vary the spray pattern emerging from said material passage without changing the dimensions of said material passage at said outlet orifice.

30. The electrostatic spray gun of claim 29 which further includes a hose for connecting said electrostatic spray gun to said pneumatic conveyer line and quick change clamping means on said electrostatic spray gun for releasably clamping said hose to said electrostatic spray gun.

31. An electrostatic spray gun for use in a powder spray system of the type having a hopper and a hopper discharge passage through which particulate powder material may flow into a pneumatic conveyer line, which electrostatic spray gun comprises
an electrically nonconductive barrel,
a recess in one end of said barrel, said recess being surrounded by an axially extending flange of said barrel,
a slide movably mounted within said recess internally of said flange,
a continuous material passage extending axially in said barrel and said adjustable slide terminating in an outlet orifice in said slide,
a spray shaping horn fixedly secured to said slide and located in said passage adjacent said orifice,
means for applying an electrical charge to powder material as it is ejected from said orifice, and
means for adjusting said slide relative to said barrel flange to vary the spray pattern emerging from said material passage without changing the dimensions of said material passage at said outlet orifice.

32. The electrostatic spray gun of claim 31 which further includes a hose for connecting said electrostatic spray gun to said pneumatic conveyer line and quick change clamping means on said electrostatic spray gun for clamping said hose to said electrostatic spray gun, said quick change means including a means for receiving and locking said hose to the spray gun.

33. An electrostatic spray gun for use in a powder spray system of the type having a hopper and a hopper discharge passage through which particulate powder material may flow into a pneumatic conveyor line, which pneumatic conveyer line terminates at said electrostatic spray gun, which electrostatic spray gun comprises
an electrically nonconductive barrel,
a continuous material passage extending axially in said barrel and terminating in an outlet orifice,
a spray shaping horn located in said passage adjacent said orifice,
means for applying an electrical charge to powder material as it is ejected from said orifice, and
means for adjusting the pattern of powder material ejected from said orifice without changing the dimensions of said material passage at said outlet orifice.

34. An electrostatic spray gun for use in a powder spray system of the type having a hopper and a hopper discharge passage through which particulate powder material may flow into a pneumatic conveyor line, which pneumatic conveyer line terminates at said electrostatic spray gun, which electrostatic spray gun comprises
an electrically nonconductive barrel,
an annular member located adjacent the discharge end of said barrel,
a pattern adjusting member located internally of said annular member,
a continuous material passage extending axially through said barrel and terminating in an outlet orifice,
a spray shaping horn mounted upon said pattern adjusting member,
means for applying an electrical charge to powder material as it is ejected from said orifice, and
means for adjusting one of said members relative to the other to vary the spray pattern emerging from said orifice without changing the dimensions of said material passage at said outlet orifice.

35. An electrostatic spray gun for use in a powder spray system of the type having a hopper and a hopper discharge passage through which particulate powder material may flow into a pneumatic conveyor line, which pneumatic conveyor line terminates at said electrostatic spray gun, which electrostatic spray gun comprises an electrically nonconductive barrel, a continuous material passage extending axially in said barrel and terminating in an outlet orifice, a spray shaping horn located in said passage adjacent said orifice, means for applying an electrical charge to powder material as it is ejected from said orifice, and means for separating air entrained powder material from the entrainment air stream as said powder is ejected from said orifice.

36. The electrostatic spray gun of claim 35 in which said separating means includes means for focusing said powder toward the axis of said passage while simultaneously directing said air stream radially away from axis.

37. An electrostatic spray gun for use in a powder spray system of the type having a hopper and a hopper discharge passage through which particulate powder material may flow into a pneumatic conveyor line, which pneumatic conveyor line terminates at said electrostatic spray gun, which electrostatic spray gun comprises an electrically nonconductive barrel, an annular member located adjacent the discharge end of said barrel, a pattern adjusting member located internally of said annular member, a continuous material passage extending axially through said barrel and terminating in an outlet orifice, a spray shaping horn mounted upon said pattern adjusting member, means for applying an electrical charge to powder material as it is ejected from said orifice, and separating means including means for adjusting one of said members relative to the other to control and vary the degree of separation of air entrained powder from the entrainment air stream as said powder emerges from said orifice.

38. The electrostatic spray gun of claim 37 in which said separating means includes means for focusing said powder toward the axis of said passage while simultaneously directing said air stream radially away from said axis.

39. The electrostatic spray gun of claim 38 in which said focusing means includes a curved outer end surface on said annular member.

40. The electrostatic spray gun of claim 39 in which said curved outer surface is convex.

41. An electrostatic spray gun for use in a powder spray system of the type having a hopper and a hopper discharge passage through which particulate powder material may flow into a pneumatic conveyor line, which pneumatic conveyor line includes a hose for connecting said pneumatic conveyor line to the electrostatic spray gun, which electrostatic spray gun comprises an electrically nonconductive barrel, a material passage in said barrel terminating in an outlet orifice, means for applying an electrical charge to said material as it is ejected from said orifice, an electrical resistor, first electrically conductive connector means connecting one end of said resistor to said electrical charge applying means, a high voltage power supply, second electrically conductive connector means connecting said resistor to said high voltage power supply, and a quick change clamping means in said gun for clamping said hose in said gun in a position in which it is in fluid communication with said material passage of said gun barrel, said quick change means including a pivoted clamp and means for locking said clamp in a closed position, said electrostatic spray gun barrel having a recess in one end, said recess being surrounded by an axially extending flange of said barrel, a slide movably mounted within said recess internally of said flange, a material passage extending axially through said adjustable slide and terminating at an outlet orifice in said slide, a spray shaping horn fixedly secured to said slide and located in said slide passage adjacent said orifice, and means for adjusting said slide relative to said barrel flange to vary the spray pattern emerging from said material passage without changing the dimensions of said material passage at said outlet orifice.

* * * * *